United States Patent [19]

Buchtel

[11] 3,895,739

[45] July 22, 1975

[54] DISPENSER FOR FLUSH TANK

[75] Inventor: Dean H. Buchtel, Canton, Ohio

[73] Assignee: NuCon, Inc., North Canton, Ohio

[22] Filed: Aug. 23, 1973

[21] Appl. No.: 390,865

Related U.S. Application Data

[63] Continuation-in-part of Ser. No. 202,905, Nov. 29, 1971, Pat. No. 3,784,058.

[52] U.S. Cl. .................. 222/57; 4/227; 222/564
[51] Int. Cl. ........................................ E03d 9/03
[58] Field of Search ...... 4/222, 227 X, 228; 222/57, 222/564 X, 182, 185

[56] References Cited
UNITED STATES PATENTS

| | | | |
|---|---|---|---|
| 3,177,502 | 4/1965 | Meunier | 4/228 |
| 3,698,021 | 10/1971 | Mack et al. | 4/227 |
| 3,787,904 | 1/1974 | Lerner | 4/227 |

FOREIGN PATENTS OR APPLICATIONS

| | | | |
|---|---|---|---|
| 51,669 | 1/1912 | Austria | 222/564 |

*Primary Examiner*—Robert B. Reeves
*Assistant Examiner*—Harry H. Martin
*Attorney, Agent, or Firm*—Oldham & Oldham

[57] ABSTRACT

A device for dispensing a measured quantity of first liquid into a body of a second liquid as the second liquid falls and rises. A container for the first liquid has a dispensing nozzle which includes a small orifice. The nozzle is at the lowermost point of the container which is otherwise closed. A U-shaped passage extends from the orifice to an opening within the container adjacent the lowest point thereof. The opposite side of the orifice communicates with an open-bottomed chamber. As the second body of liquid rises air entrapped in the open-bottom chamber is forced through the orifice and U-shaped passage and into the container. When the second body of liquid subsequently drops a controlled quantity of the first liquid is drawn out of the container.

8 Claims, 11 Drawing Figures

PATENTED JUL 22 1975 3,895,739
SHEET 1
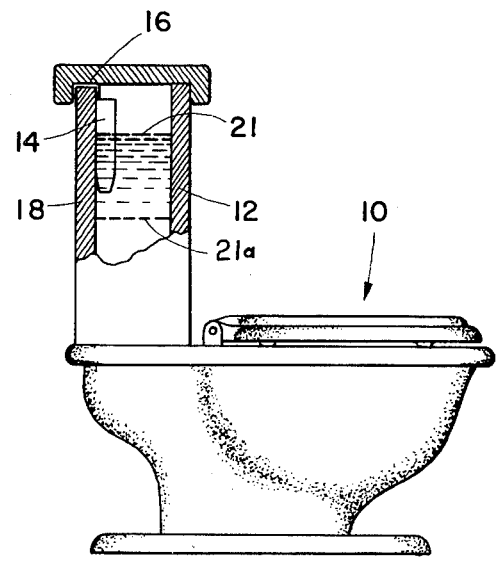
FIG. 1
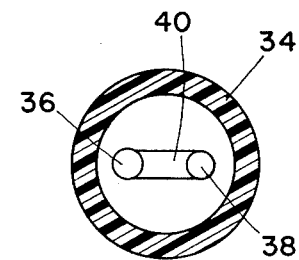
FIG. 4
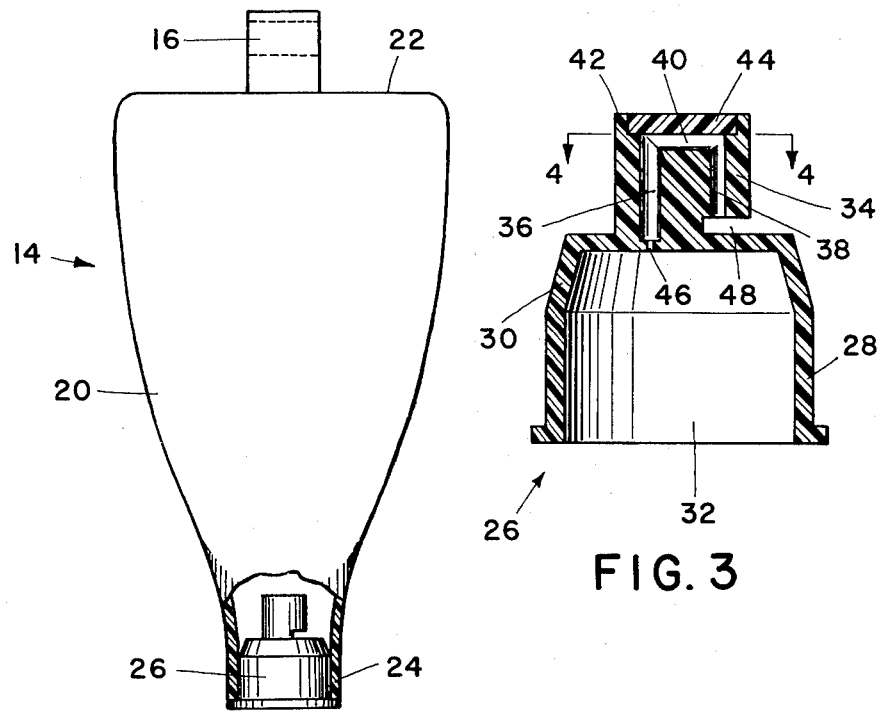
FIG. 2
FIG. 3

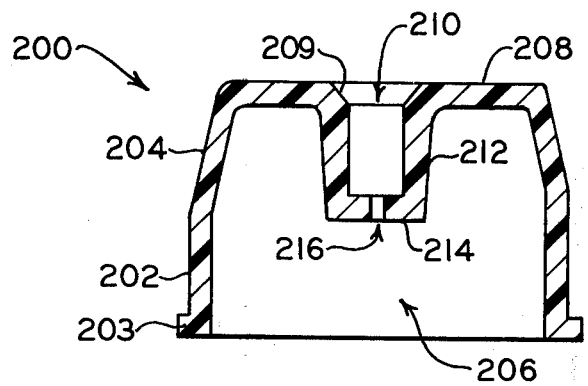
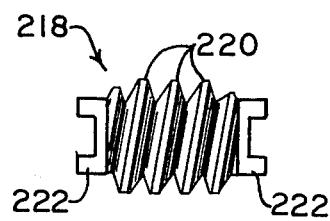
FIG 7  FIG 8
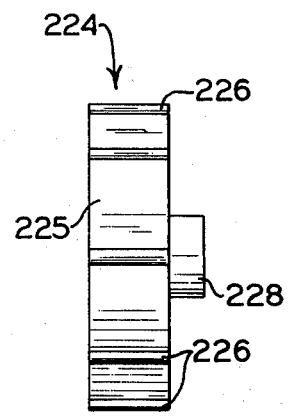
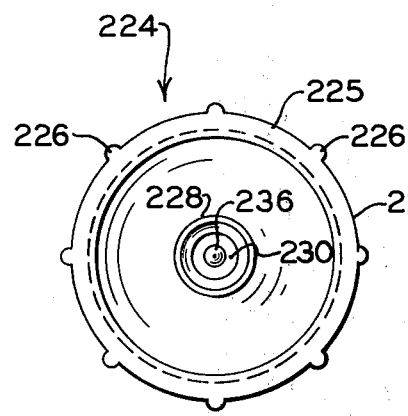
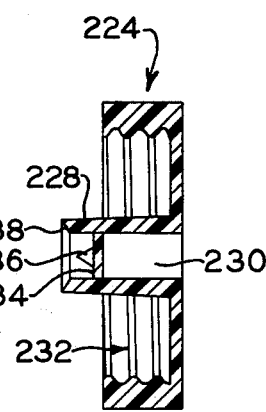
FIG 9  FIG 10  FIG 11

DISPENSER FOR FLUSH TANK

This is a continuation-in-part of copending patent application Ser. No. 202,905, filed Nov. 29, 1971, and now U.S. Pat. No. 3,784,058.

The present invention relates to apparatus for dispensing a small measured quantity of a liquid and, more particularly, to apparatus for dispensing a controlled quantity of first liquid into a second liquid which apparatus is actuated by the rising and falling of the level of the second liquid.

One of the primary uses of such dispensing apparatus is the dispensing of a quantity of deodorizing and/or disinfecting liquid into the water in the flush tank of a toilet. It will be understood, however, that while the embodiment of the invention described herein is intended for such use, the invention is not limited to that particular use but may be used in any situation where controlled dispensing is desired and where the liquid is to be dispensed into a second liquid whose level rises and falls.

Various liquid dispensers for dispensing small quantities of first liquid into a second liquid have been proposed heretofore. However, these earlier dispensers have a number of serious disadvantages. Among the earlier dispensers are those which ues diaphragms to obtain the dispensing action. Such dispensers, however, must be provided with check valves which may become blocked or otherwise damaged so that the dispenser does not function properly. Also, the necessity of providing the diaphragm and the valves substantially increases the cost of the dispenser unit. When the dispenser is intended for use with a deodorizing or disinfecting solution this added cost is a major disadvantage since, preferably, the dispenser is a throw away package which may be replaced in its entirety when the quantity of fluid contained within the dispenser is exhausted.

Other dispensers have relied on a siphoning action to achieve the desired controlled dispensing. These dispensers require a reservoir separate from the main body of the disinfecting or deodorizing fluid so that only a controlled quantity is dispensed with each cycle of operation. Again, this arrangement increase the complexity and cost of the dispensing unit.

It is the primary object of the present invention to provide a liquid dispenser which will automatically dispense a controlled quantity of the first liquid into a second liquid and which accomplishes this result without the necessity of diaphragms, valves, or other moving parts.

It is also an object of the present invention to provide a dispenser which may be of simple and inexpensive construction, making it feasable to package the entire dispenser as a throw away item.

A further object of the invention is the provision of such a dispenser which eliminates the need for separate measuring reservoirs.

The above and other objects of the invention which will become apparent in the following detailed description are achieved by providing a dispenser which consists essentially of a bottle having a nozzle assembly and an orifice in the nozzle assembly, a U-shaped passage communicating with the orifice and extending to the lowest point of the bottle, and an openbottomed chamber also communicating with the orifice and positioned so as to have its lower end beneath the surface of the second body of fluid when this body of fluid is at its upper level and to have its lower end exposed to the atmosphere when the second body of fluid drops to a lower level.

For a more complete understanding of the invention and the objects and advantages thereof reference should be had to the following detailed discription and the accompanying drawings wherein there is shown a preferred embodiment of the invention.

IN THE DRAWING

FIG. 1 is a side elevational view of a toilet equipped with a dispenser of the present invention, portions of the structure being broken away to show the location of the dispenser;

FIG. 2 is a front elevational view of the dispenser of the present invention, a portion of the dispenser bottle being broken away for clarity;

FIG. 3 is a transverse sectional view of the dispensing nozzle of the container of FIG. 2;

FIG. 4 is a sectional view taken along the line 4—4 of FIG. 3;

Figure 5:
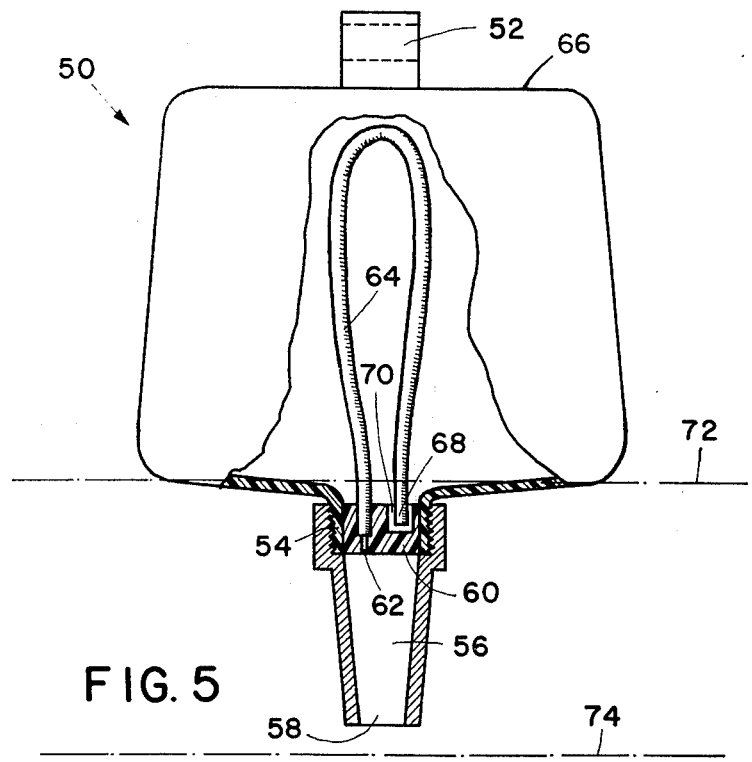
Figure 6:
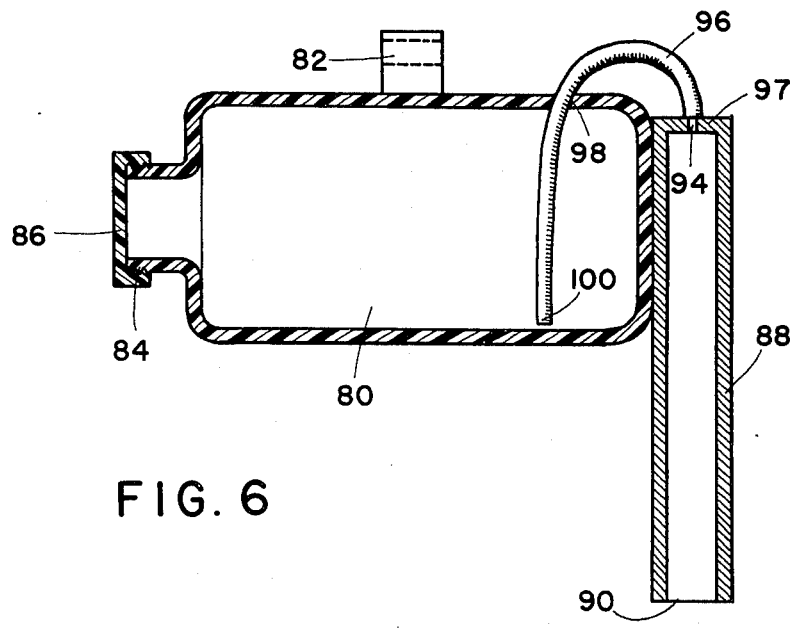

FIG. 5 is an elevational view, partially ensectioned, of a second embodiment of the dispenser of the present invention, FIG. 6 is a sectional view of a third embodiment of the dispenser of the present invention, FIG. 7 is a cross sectional view of a second nozzle member according to the invention, FIG. 8 is a front plan view of an insert for use with the nozzle of FIG. 7, FIG. 9 is a side plan view of a cap for making sealing engagement with the nozzle of FIG. 7, FIG. 10 is a bottom plan view of the cap of FIG. 9;

and

FIG. 11 is a cross sectional view of the cap of FIG. 9.

Referring first to FIG. 1 there is shown a toilet designated generally by the reference numeral 10. The toilet 10 is a conventional construction and includes a tank 12 which holds a quantity of water which, upon release, serves to flush the toilet. In order to inject a quantity of deodorizing and/or disinfecting fluid into the water of the tank 12, the dispensing apparatus 14 of the present invention is mounted within the tank 12, perferably by means of a strap 16 which engages one of the wall 18 of the tank. The dispenser 14 is located within the tank so that the water level 21 in the tank at least partially covers the dispenser at its upper level while falling completely free of the dispenser when at its lower level 21a. As will be more clearly understood below, the dispenser 14 operates to dispense a measured quantity of the liquid contained therein each time the water within the tank 12 falls to the level 21a and returns to the upper level 21.

The dispensing apparatus 14 is illustrated in greater detail in FIGS. 2–4. The fluid to be dispensed is contained within a bottle 20. The hook 16 is attached to the bottle 20 so that the closed end 22 of the bottle is uppermost when the bottle is suspended in its operative position. The open end 24 of the bottle receives a dispensing nozzle assembly 26, illustrated in FIGS. 3 and 4 and described in detail below. It should be understood that, with the exception of the dispensing nozzle 26, the bottle 20 is a closed container.

The dispensing nozzle 26 has a cylindrical portion 28 which has a tight fit with the opening 24 of the bottle 20. Immediately above the cylindrical portion 28 the walls of the nozzle 26 may taper inwardly slightly, as indicated at 30, so that the nozzle may be inserted in to the end of the bottle. The outer diameter of the cylindrical portion 28 of the nozzle 26 and the inner diameter of the opening 24 of the bottle 20 are such that a fluid-tight seal is formed between the bottle and the nozzle. An adhesive coating or other sealing compound may be provided on the mating surfaces of the nozzle and the bottle, if necessary, to assure that a fluid-tight seal exists. The walls 28 and 30 of the nozzle 26 define an open bottomed chamber 32. Projecting upwardly from the chamber 30 and within the confines of the bottle 20 is an upper portion 34 of the nozzle. This portion is provided with bores 36 and 38 and a cross bore 40 connecting the two bores 36 and 38 to provide a U-shaped passage. Preferably, to facilitate manufacture of the nozzle 26, a larger bore 40 is provided extending downwardly from the upper end of the portion 34 to permit the bores 36 and 38 to be formed as well as to permit the cross bore 40 to be formed. A suitable plug 44 seals the upper bore 40 after the formation of the passages 36, 38, and 40. A small diameter orifice 46 connects the lower end of the bore 36 to the open end of the bore 32 while a slot 48 connects the lower end of the bore 38 to the interior of the bottle 20.

A suitable cap or other sealing member (not shown), may be placed in the bore 32 to seal the container for shipment and storage. This sealing member is, of course, removed before the dispenser is placed in operation.

Assuming that there is a quantity of fluid within the bottle 20 and that the level of the water within the tank 12 is below the lower end of the nozzle, the operation of the dispensing apparatus of the present invention will be briefly described. As the water level rises to its upper level 21 air is trapped within the open bottom chamber 32 by the rising water and is subsequently forced through the orifice 46 and the U-shaped passage consisting of the bores 36 and 38 and the cross bore 40 into the interior of the bottle 20. As the water level drops, for example, upon flushing of the toilet, from its upper level suction is created by the falling water level so that fluid from within the bottle 20 is drawn through the U-shaped passage and the orifice 46. The amount of fluid withdrawn depends on the diameter of the orifice 46. After the water level has dropped below the lower edge of the nozzle 32 pressure equilization takes place and no further liquid is dispensed. Subsequent rising of the water level conditions the dispenser for the next dispensing cycle.

A second embodiment of the invention is illustrated in FIG. 5. In this embodiment the dispenser assembly includes a bottle 50 which is provided with a suitable strap 52 for hanging the bottle in an inverted position. Threaded to the opening 54 of the bottle is an elongated spout 56 which is open at its lower end and provided at its upper end with a plug 60. A small diameter orifice 62 extends through the plug and communicates with a U-shaped tube 64 which extends upwardly to nearly the opposite end 66 of the bottle and downwardly with its open end 68 being received within a well 70 in the plug 60. A removable cap, plug, or other sealing member (not shown) can be provided for shipping and storage. For example, a removable washer may be placed between the nozzle 60 and the spout 56. The dispensing action of this device is identical to that of the previously described embodiment. Thus, when the water level falls from its upper level 72 to its lower level 74 a small quantity of liquid within the container 50 is drawn through the orifice 62 into the elongated spout 58. By locating the open end 68 of the U-shaped tube 64 within the well 70 the arrangement assures that substantially the entire quantity of liquid within the container may be dispensed.

A further modification of the invention is shown in FIG. 6 where the container 80 is provided with a suitable hook or other hanger 82 and has a threaded opening 84 which is sealed by a cap 86. An elongated tube 88 open at its lower end 90 and closed at its upper end 97 is positioned to extend vertically so that the lower end 90 is submerged when the water is at its upper level and uncovered when the water is at its lower level. A small diameter orifice 94 provided in the closed upper end 97 of the tube 88 communicates with a U-shaped tube 86 which extends through an opening 98 in the bottle 80 and has its lower end 100 positioned at the lowest point of the bottle. The tube 96 has a fluid-tight seal at the point 98 at which this tube passes through the wall of the bottle 80. The elongated tube 88 may be attached to the bottle 80 or may be carried separately from the bottle if desired. Again, the dispensing action is the same as that in the previously described embodiment, the small diameter orifice 94 determining the amount of liquid which will be drawn from within the container 80 as the water level drops from its upper to its lower level.

FIG. 7 presents a cross sectional view of a nozzle 200 quite similar in nature to the nozzle 26 illustrated in FIGS. 2–4. As can be seen from FIG. 7, the nozzle 200 again comprises a cylindrical portion 202 which is preferably tapered at 204 to facilitate insertion into the opening 24 of the bottle 20. Again, the characteristics of the cylindrical portion 202 are such that a fluid tight seal is effectuated at the opening 24 with the flanges 203 flushly adjacent the rim thereof. Similar to the nozzle 26, the nozzle 200 has an open bottom chamber 206 encircled by the cylindrical portion 202 but the upper portion 34 present on the nozzle 26 is deleted.

Opposite the chamber 206 and extending from the tapered walls 204 is a disc-like top 208 connected to the vertical cylindrical wall 212 which extends into the chamber 206. The cylindrical wall 212 defines a recess 210 opposite the chamber 206. The cylindrical wall 212 is perpendicularly connected to a disc-like cap 214 separating the annular recess 210 from the chamber 206, the cap 214 having an orifice 216 enabling communication between the recess 210 and the chamber 206. The orifice 216, similar in nature to the orifice 46 described hereinabove, is of a substantially small diameter, preferably 0.030 inches.

As can be seen in FIG. 8, an insert 218 is provided for engagement with the annular recess 210. The insert 218 is substantially cylindrical in nature and is characterized by the presence of a plurality of threads 220 spirally wound thereabout. The diameter of the insert 218 taken across the width of the threads 220 is preferably equal to the diameter of the recess 210 and the length of the insert 218 is substantially equal to the depth thereof. As will be discussed fully hereinafter, the insert 218 is forced into the recess 210 such that the threads 220 make a sealing engagement with the interior walls thereof. Protrusions 222 on each end of the insert 218 allow the insert 218 to be held at one end while being forced into the recess 210 and provide means for engaging the bottom of the recess 210 without sealing the orifice 216. It should be understood that the cylindrical wall 212 does not have threads thereon and thus the insert 218 is merely pushed into its position within the recess 210. However, it will become apparent hereinafter that the cylindrical wall 212 could indeed be threaded but in such case the insert 218 would not be threaded. The overall effect would be the same since it is the mating of a threaded surface with an unthreaded surface which defines the elongated passageway from the interior of the container to the orifice 216.

With the insert 218 positioned within the recess 210 and with the nozzle assembly 200 sealingly engaged within the opening 24, it should be understood that an elongated passageway is defined from the interior of the bottle 20 along the spiral recesses created by the threads 220 and through the orifice 216. The elongated passageway will be spiral in nature and will have triangular cross sectional characteristics. It will be understood that if the pitch of the threads 220 creates a 60° angle as shown in FIG. 8, and if the depth of the threads 220 are 0.030 inches then the cross sectional area of the elongated passageway will be substantially equivalent to the cross sectional area of the 0.030 inch orifice 216. Of course, the number of threads 220 and the pitch and depth thereof may be varied to achieve the desired results.

As is well known in the art, when fluid is flowing through a passageway at a low velocity the flow of the fluid will most likely be laminar in nature; that is, the fluid will tend to flow in layers wherein the layers immediately adjacent the walls of the passageway will be stationary and each layer will be retarded to some degree by the layer immediately adjacent to it. It is of course well known that in such laminar flow the fluid immediately adjacent the wall is stationary and increases in velocity to the center of the passageway such that fluid flowing through the center is at the highest velocity. When the passageway is extremely small or narrow, the center thereof is very nearly adjacent the walls and hence the fluid passing through the center is greatly retarded by its immediately adjacent laminar layers. Hence, to achieve a slow dispensing of fluid from the container 20 it is most desirable that the passageway be quite narrow as is dictated by the dimensions related hereinabove.

It is further known that the viscous forces within a fluid tend to hold laminar layers together such that for any given passageway fluids of high viscosity will have characteristically lower velocities than fluids with low viscosity. Consequently, considerations must be given both to the viscosity of the fluid and to the size of the passageway in order to achieve the proper dispensing rate.

The rate of flow of a fluid within a passageway is also greatly dependent upon the characteristic roughness of the passageway. When the velocity through a rough passageway is relatively low, the flow therethrough will still be laminar and not turbulent so that the considerations presented hereinabove will still be applicable. It is only when the velocity through a rough passageway is high that turbulent action will occur and thus destroy the laminar flow. With a passageway which is rough in nature, frictional forces or a "friction factor" must be contended with when achieving the desired rate of flow. The friction factor decreases the effective velocity of the fluid through the passageway by substantially increasing the thickness of the stationary laminar layer immediately adjacent the walls of the passageway. By increasing the thickness of this stationary laminar layer the effective diameter of the passageway is decreased and hence the stationary laminar layer will have a greater effect upon that laminar layer passing centrally through the passageway.

Further, considerations must be given to capillary action of an extremely narrow passageway, the capillary action attempting to make the fluid rise rather than fall.

Thus it can be seen that the friction factor, capillary action, and diameter of a passageway must be given careful consideration in order to achieve the objects of the invention. The spirally wound elongated passageway in the instant invention is narrow in cross sectional area, and long in length. It is also preferably that the passageway be surrounded by walls of a plastic material such as low densitiy polyethylene, such walls being rough in nature as compared with polished steel or the like. Hence, the spirally wound elongated passageway of the instant invention will present a restrictive passageway for the flow of the fluid from the bottle 20 through the orifice 206. It should be noted that by using the insert 218 in the recess 210 the passageway is substantially longer in nature than that shown in FIG. 3 and is totally enclosed within the chamber 206 and does not protrude above the nozzle element as does the passageway of the nozzle 26. Hence, the possibilities of damaging the passageway during handling are alleviated. Further, the recess 210 has a taper periphery 209 about the top edge thereof so that all of the fluid contained within the bottle 20 will eventually be dispensed whereas the embodiment shown in FIGS. 2–4 would allow a final amount of fluid in the bottle 20 resting within the area 48 to be wasted.

As would be the case with the nozzle member 26, the nozzle member 200 having the insert 218 properly placed within the recess 210 would allow a time delay to be realized during the dispensing cycle before any fluid would be dispensed through the orifice 216. It should be understood that after a dispensing cycle, when the water level begins to rise upward so as to capture air within the chamber 206, this air is forced up through the orifice 216 and the spirally wound passageway defined by the threads 220 and into the top of the bottle 20 so as to build a head of air therein. When the dispensing cycle is again actuated by the flushing of the toilet 10, the air retained within the spirally wound elongated passageway must first be expelled before any fluid from the bottle 20 is dispensed. Hence, there is a slight delay realized during the dispensing cycle. This delay is further important when the bottle 20 is first inverted for use since it will prevent the immediate discharge of any fluid.

It should also be noted that the nozzle 200 may be utilized in dispensing apparatus other than toilet bowl freshners. Indeed, if the bottle 20 were to have a small opening in the end thereof opposite the opening 24, it has been found that the nozzle is capable of dispensing droplets of deodorizing or other type fluid from the bottle at an extremely slow rate, as slow as one drop per hour. Of course, the rate of dispensing may be characteristically devised for the nozzle 200 by giving the considerations of the design of the insert 218, the orifice 216, and the viscosity of the fluid as related hereinabove.

Applicant has found that by varying the length and characteristics of the protrusion 222 placed within the recess 210 the rate and amount of fluid dispensing from the bottle 20 may be regulated. This is apparently true because the notched protrusion creates a small reservoir in the recess 210 between the last thread 220 on the insert 218 and the bottom 214. By varying the length or thickness of the protrusion 222 or the notched out portion thereof, the characteristics of the reservoir are altered hence altering the characteristic dispensing from the nozzle 200.

Of course, the characteristics of the reservoir may be effectively altered by controlling the degree of insertion of the insert 218 into the recess 210. Applicants have found that the combination of the recess 210 and the insert 218 provides a unique fluid metering valve. By controlling the degree of insertion of the insert 218 within the recess 210, the length and restrictive characteristics of the elongated passageway created thereby may be controlled. By so controlling these characteristics, the rate of passage of fluid through the passageway may be accurately regulated. If appropriate insertion adjusting means are provided in operative connection with the insert 218, the combination as described may be utilized as an infinitely variable valve. Of course, a manually operated vernier dial or an appropriate servo mechanism might be utilized for achieving the desired results.

With reference now to FIGS. 9–11, a unique cap assembly for utilization with the nozzle 200 may be seen. Fundamentally, the cap 224 comprises a circular top 225 having a cylindrical side 227 extending downwardly therefrom. The side 227 is characterized by the presence of outstanding vertical ribs 226 equally spaced thereabout. A cylinder-like protrusion 228 extends centrally from the top 225 of the cap 224. The protrusion 228 defines a recess 230 in the top 225. A circular bottom 234 seals the recess 230. A plurality of threads 232 are present along the inside circumference of the side 227 and are formed to make threaded engagement with mating threads about the neck of the bottle 20 (not shown). A sealing point 236 is centrally located on the bottom 234 on the side of the cap 224 opposite the top 225. As can be seen, the bottom 234 and the sealing point 236 are recessed in the protrusion 228. The protrusion 228 has a bevelled ridge 238 at the bottom portion thereof.

As the cap 224 is screwed onto the top of the bottle 20 the bevelled rim 238 makes engagement with the cylindrical wall 212 of the nozzle assembly 200 and guides the protrusion 228 therealong such that the sealing point 236 sealingly engages with the orifice 216. Thus, with the head 224 so engaged, leakage of fluid from the bottle 20 will be prevented during handling thereof.

It will be understood that while only the best known embodiments of the invention have been illustrated and described in detail herein the invention is not limited thereto or thereby. Reference should therefore be had to the appended claims in determining the true scope of the invention.

What is claimed is:

1. Apparatus for containing and regulating the dispensing of fluids, comprising:

a container for the fluid, the container having an opening at its lowermost point;

a nozzle member received in sealing engagement with the opening, the nozzle member defining an open bottomed chamber and having a recess depending from the top thereof into the chamber, the recess having an orifice therein in communication between the chamber and the interior of the container; and insert means received within the recess and defining therewith an elongated spiral passageway extending upwardly from the orifice to a point adjacent an upper end of the nozzle, wherein the insert is positionally movable within the recess, the degree of insertion of the insert in the recess regulating the flow-restrictive characteristics of the passageway.

2. The apparatus as recited in claim 1 wherein the insert means comprises a solid cylinder and wherein the interior periphery of the recess is characterized by the presence of spiral threads wound thereabout, the cylinder engaging with the threads to define a spiral elongated passageway.

3. The apparatus as recited in claim 1 wherein the insert means is slidingly movable within the recess.

4. The apparatus as recited in claim 1 which further includes a cap sealingly covering the open bottomed chamber and having a point protruding centrally therefrom in sealing engagement with the orifice.

5. The apparatus as recited in claim 1 wherein the insert means comprises a solid cylinder with external threads spirally wound thereabout and wherein the recess is smooth walled to define with the threads the spiral passageway.

6. Liquid dispensing apparatus, comprising:

a container for the liquid having an opening at its lowermost point;

a nozzle member receivably engaged within the opening, the nozzle member defining an open bottomed chamber having a recess depending from an end thereof and into the open bottomed chamber, the recess having a small diameter orifice at the bottom thereof communicating between the chamber and the interior of the container; and a threaded insert receivably engaged within the recess and engaging the sides thereof and defining therewith a spiral elongated restrictive passageway between the orifice and the interior of the container wherein the threaded insert is positionally movable within the recess, the degree of insertion of the threaded insert in the recess regulating the flow-restrictive characteristics of the passageway.

7. The liquid dispensing apparatus as recited in claim 6, which further includes a cap adaptable to be received over the nozzle member, the cap having a point protruding centrally therefrom and making mating sealing engagement with the orifice.

8. The liquid dispensing apparatus as recited in claim 7 wherein the point is encompassed by a tapered protrusion adaptable to be guidably received about the recess of the nozzle member.

* * * * *